No. 846,666. PATENTED MAR. 12, 1907.
B. M. W. HANSON.
CYLINDRICAL REAMER.
APPLICATION FILED JULY 17, 1902.

Witnesses:
H. Mallner
Joseph Merritt

Inventor
B. M. W. Hanson
By W. H. Honiss. Atty.

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

CYLINDRICAL REAMER.

No. 846,666.   Specification of Letters Patent.   Patented March 12, 1907.

Application filed July 17, 1902. Serial No. 115,954.

*To all whom it may concern:*

Be it known that I, BENGT M. W. HANSON, a citizen of Sweden, and a resident of Hartford, in the county of Hartford and State of Connecticut, have invented certain new and useful Improvements in Cylindrical Reamers, of which the following is a full, clear, and exact specification.

This invention is an improved reamer for cylindrical holes, having successive sets or series of cutting edges which may be brought successively into operation during the lifetime of the tool and which are preserved in proper cutting condition until brought into use, thus practically renewing the life of the reamer while maintaining its cutting diameter.

Figure 1:
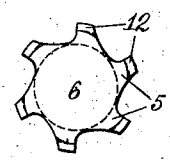
Figure 2:
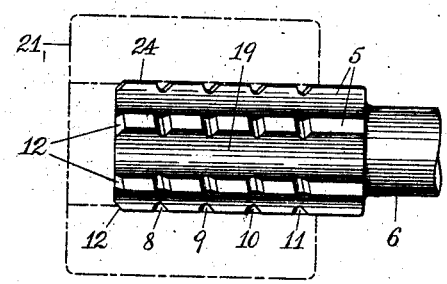
Figure 4:
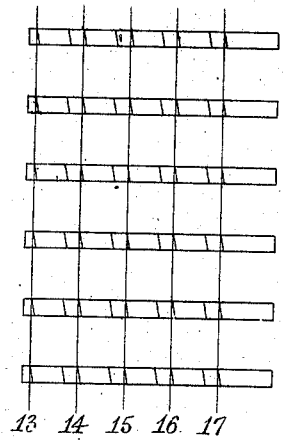
Figure 3:
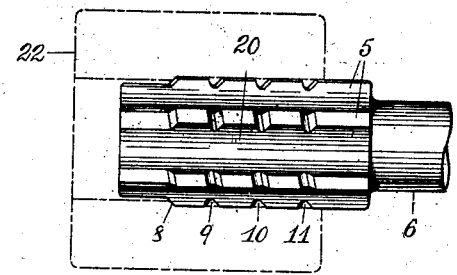

Figure 1 of the drawings is an end view, and Fig. 2 a side view, showing the body or operative end of a reamer embodying this invention, the shank of the reamer being broken away in Fig. 2, which also shows in dot-and-dash outline a piece of work to illustrate the operation of the reamer. Fig. 3 is a side view similar to that of Fig. 2, showing the reamer of Fig. 2 after the second series of cutting edges has been brought into operation. Fig. 4 is a flat development representing the cutting-ribs of the reamers of the preceding figures and showing the correlation of the interrupted cutting-ribs and of the successive series of cutting edges formed thereby.

The reamer herein shown is provided with six equally-spaced cutting-ribs; but neither the number nor the spacing of these ribs form any material part of this invention, which is applicable to any number or any arrangement of cutting-ribs of a parallel-sided reamer. The ribs 5 may also be inclined or spiral instead of being straight and parallel with the axis, as herein shown. These ribs are also shown as being integral with the body 6 of the reamer; but this obviously is also an immaterial circumstance, since this invention may be as readily applied to a reamer having inserted teeth or blades.

In this invention the cutting-ribs 5 are provided with the circumferential series of notched interruptions 8, 9, 10, and 11, each in a plane at right angles with the axis of the reamer.

The individual notches are not at right angles with the axis of the reamer, but are each inclined at an angle therewith, so as to afford a proper cutting clearance for each of the new edges formed by these interruptions, similar to the clearance which is shown at 12 and as also shown in the flat development of Fig. 4 by the inclined shoulders of those cuting edges adjacent to the lines 13, 14, 15, 16, and 17, which lines represent the coincident circumferential relation of each series of cutting edges of the reamers of Figs. 2 and 3. Thus the successive circular series of cutting edges are disposed in planes which are at right angles with the axis of the reamer, so that all the edges of a series will cut uniformly and at the same time.

In cylindrical reamers of this class the direction of cut is always endwise, as illustrated in Figs. 2 and 3, by the progress of the reamers 19 and 20 through the respective pieces of work 21 and 22. In each case the cutting is all done by the foremost cutting edges of the reamer, the circumferential surfaces of the ribs serving only, or at least mainly, to fit in the hole that is reamed, and thereby guide the reamer forward in a straight path, incidentally serving also to scrape out the chips that are formed by the cutting operation and prevent them from becoming wedged between the cutting-ribs and the walls of the bore.

Each section 24 of the interrupted cutting-ribs serves to protect the cutting edge behind it from injury. In other words, the second series of edges formed by the interruptions 8 is protected from injury during the cutting lifetime of the edges 12 by means of the sections 24, thus preserving the sharpness originally imparted to them and holding it in reserve until wanted.

When the cutting edges 12 of the reamer have become blunt by use, the sections 24 behind those edges are ground away to the condition shown in Fig. 3, thus bringing the second series of edges 8 into operation. This grinding requires no particular skill, since it is not essential that they should be ground to any definite or uniform size. All that is required is to grind the sections 24 away far enough to bring the second series of cutting edges into operation, and this may be done upon an ordinary grindstone or emery-wheel and by any mechanic able to grind the simplest kind of tool. Thus as each succeeding series of cutting edges becomes dull its accompanying sections of the cutting-ribs are to be ground away, thus repeatedly renewing the useful lifetime of a reamer and correspondingly multiplying its ultimate capacity for work.

Under modern methods of manufacture reamers and other small tools of this class are manufactured in large quantities by special machinery which has a high productive capacity and also insures extreme accuracy in the product. By these modern methods the improved reamer herein shown may be manufactured so that the first cost of such a reamer is increased very little, if at all, over the ordinary form, while such a reamer is not only much more efficient during a long working lifetime, but it also enables standards of size in the holes reamed to be maintained with no appreciable increase in the cost.

I claim as my invention—

A reamer for cylindrical holes, having its cutting-ribs interrupted by depressions to form a plurality of independent circumferential series of cutting edges disposed in parallel planes at right angles with the axis of the reamer, the said cutting edges being provided with a cutting clearance.

In testimony whereof I have signed my name to this specification, in the presence of two subscribing witnesses, this 11th day of July, 1902.

BENGT M. W. HANSON.

Witnesses:
 JAS. W. GREEN,
 E. F. LA PORTE.